2,795,181

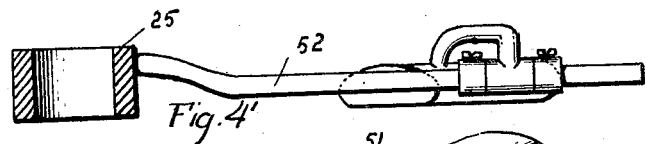
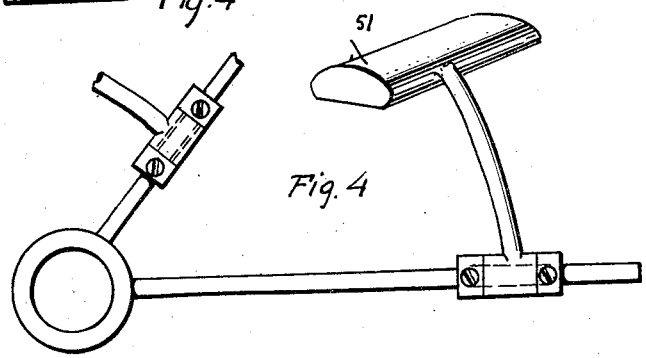
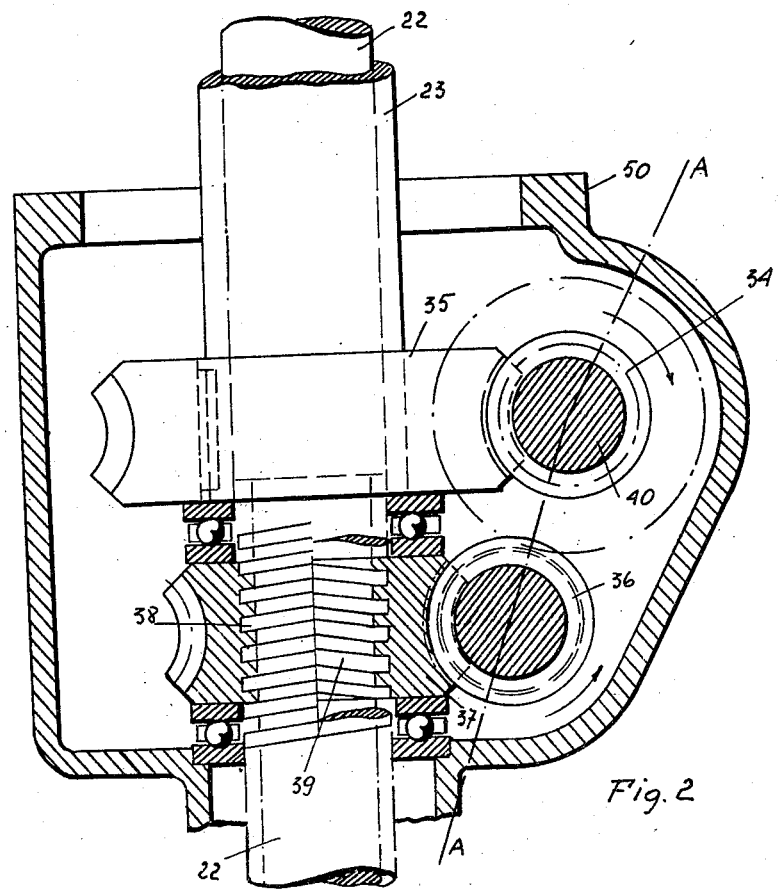

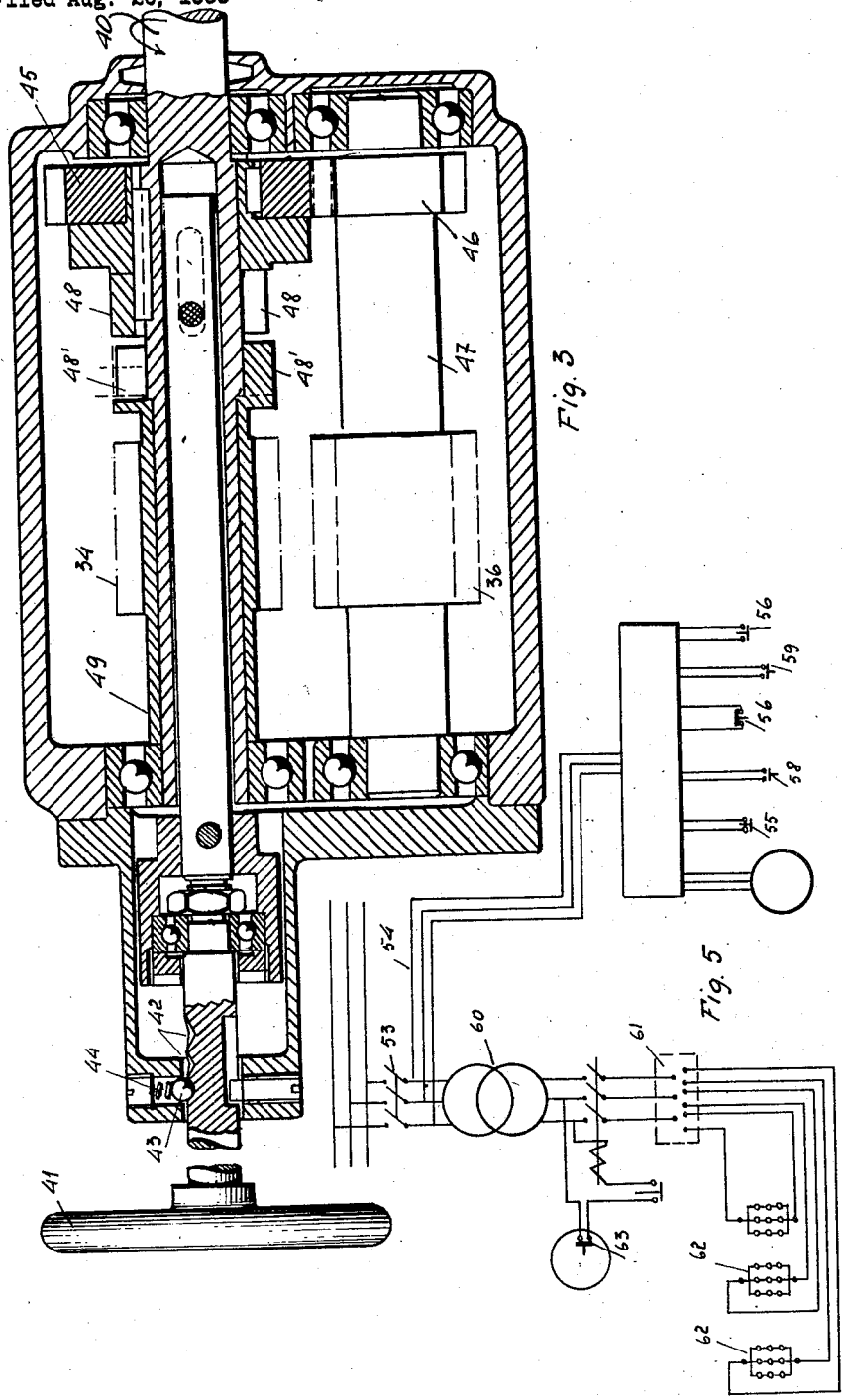

INFRA-RED ROASTER FOR COFFEE

Antonio Scolari, Milan, Italy

Application August 20, 1953, Serial No. 375,511

Claims priority, application Italy September 29, 1952

2 Claims. (Cl. 99—236)

As already well known, coffee beans are roasted by electrically, or gas, or otherwise fired machines. Very often, coffee roasting is accomplished in bulky and expensive plants, operated in a time-consuming and costly manner.

The major drawbacks shown by such plants are as follows:

(A) Disproportionately high first cost of plants.
(B) High cost of fuels.
(C) Necessity to have recourse to a thoroughly learned operator, otherwise a poor roasting—and sometimes also a charring—of coffee beans will result.
(D) High losses during the roasting operation.
(E) A long preheating time is required by the machine to make it ready for operation.

This invention relates to a procedure for infra-red roasting of coffee beans, and to an equipment for carrying same procedure into practice. The exposure to infra-red rays allows a quick and reliable roasting to be obtained. All danger of charring can be positively prevented. A further advantage of the procedure consists in that the essential and aromatic oils, which are present in the beans and give to coffee its peculiar flavor, are not volatilized.

According to the procedure object of the invention, the coffee beans to be roasted are charged into containers and then exposed to an infra-red radiation produced by conveniently located and suitably dimensioned radiators. Such radiators can be located above, and/or below the container, and in this latter case same container could be conveniently made of wire gauze or perforated metal plate. The coffee beans are continuously stirred by suitable stirrers, in order to bring them continuously under the direct action of infra-red rays. Further components of coffee roasting plant are: a stirrer driving mechanism, a frame whereon the infra-red lamps can be conveniently positioned and height adjusted, a regulator by which the radiation intensity of lamps can be adjusted, a device for unloading the roasted coffee beans, a device for the collection and disposal of trash produced during the roasting operation, an exhaust and cooling fan and a device for the cleaning of infra-red lamps. Automatic devices are also provided for the switching-off of plant after a predetermined roasting time and for the lifting of upper lamp support at the end of roasting operation. In addition, the plant can be combined with built-in, or set apart coffee mills, according to capacity and purposes to which same plant is designed.

Thus, the procedure allows the herinafter stated advantages to be obtained:

(1) Low first cost of plant.
(2) No fuel is required, and the costs are limited to that amount of electric power required for the operation of motors and infra-red lamps.
(3) The danger of charring is positively prevented; the roasting of coffee beans can be carried out under a direct control through the adjustment of lamps, i. e., of the radiation intensity thereof.
(4) Minimizing of percent losses due to trash formed during the roasting operation.
(5) Extremely reduced operation times, as i. e. only a few minutes are required for the thorough roasting of one kg. of coffee beans.
(6) No preheating of machine is required, and the necessity to bring the roasted coffee beans into another container for the subsequent cooling is also obviated, as the coffee can be cooled in the same roasting container.

The further objects and advantages of the invention will be better appreciated from a consideration of the following description—given only as a not restrictive example—of an infra-red coffee beans roasting plant designed particularly for the operation on industrial scale, being understood that simpler, or even more complex plants could be designed and built, on the basis of the inventive idea, and according to particular purpose intended, as i. e. for domestic uses, bar and hotel installations, industrial plants and so on. Referring now to accompanying drawings:

Figs. 2 and 3 show respectively a vertical section and a lateral section of the drive to revolve the shaft and to reciprocate the shaft by which the lamp supporting, upper cover can be lifted out of the machine.

Figure 1:
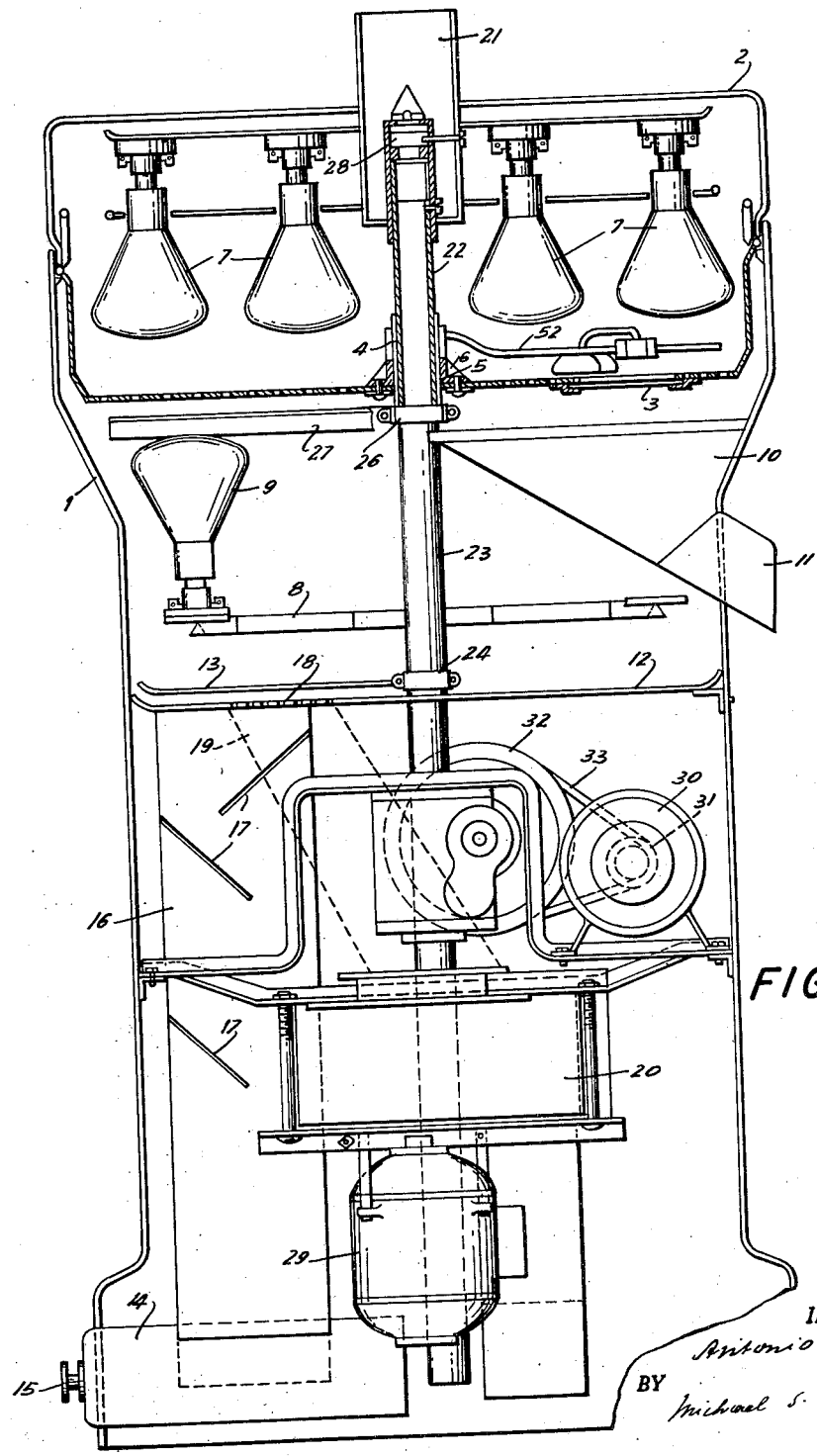
Fig. 1 is the vertical section of a complete plant.

Figs. 4 and 4' show the shape of coffee beans stirring brushes.

Fig. 5 is the wiring diagram of plant electric equipment.

Referring now particularly to Fig. 1, the machine consists of an outer shell 1, provided with an upper cover 2 tightly fitting on the upper edge thereof. The coffee beans are charged into a perforated pan 3, fitted in the upper section of said shell. A hollow shaft 4 is passed through a central hole of said pan, and is loose guided in the bush 5 provided with the ribs 6, as fitted in said central hole.

The upper set of infra-red lamps 7, by which a direct radiating action is exerted on the coffee beans charged in the pan, is supported by the cover 2.

A second set of infra-red lamps 9, carried by a suitable supporting element 8 fitted below the pan, serves to exert a radiating action against the perforated bottom thereof. A collecting hopper 10 is also fitted below the pan and discharged into a funnel 11 that comes out of shell 1.

Said narrow hopper is located below a slot of suitable width, cut on the pan bottom, and the already roasted coffee beans are discharged therethrough into the hopper 10, and then to the outside through the funnel fitted thereto.

While a roasting cycle is being carried out, the slot on the bottom of pan 3 is closed by a sliding or pivoted lid, which can be actuated from the outside of machine.

The trash and hulls formed during the roasting operation, are collected on a solid plate 12, fitted below the support 8 of lamps 9. Said plate is continuously cleaned by a suitably shaped, circularly moving brush 13, that collects the trash and hulls, causing them to fall through the vertical duct 16 into the lower drawer 4, which can be drawn out from the outside by means of handle 15. Abovesaid duct 16 starts from a slot cut on the plate 12, and is provided with inside blades 17 by which a labyrinth is formed. This is in order to prevent the trash and hulls from being sucked upwards due to a vacuum produced within the chamber defined by the plate 12 and the bottom of pan 3 when the sucking fan is in operation.

A perforated disc 18, connected through a suction duct 19 with the fan 20, as fitted below the shaft driving mechanism, is provided in the circular path of brush 13, directly after the slot leading into the vertical duct 16.

The perforated disc 18 has been purposely located directly after the slot for disposal of trash and hulls, in order to positively prevent said trash and hulls from being brought by the brush thereon, and thus from being taken by the stream of air sucked by the fan.

The fan 20 serves a double purpose, to produce an adjustable vacuum while the roasting operation is being carried out, and a stream of air for the forced cooling of coffee beans at the end of same operation, in order to prevent the essential and aromatic oils from being volatilized during the roasting. It must be pointed out that a nearly complete loss of such oils takes place with the conventional roasting procedures, due to continuous and strong sucking action required to remove the trash and hulls.

The coffee beans are charged under the cover 2, through the inlet throat 21, as defined by a cylindrical crown wherein the device that serves to connect the cover with the vertical shaft 22 is also enclosed. A funnel or hopper could be inserted into said throat to make the coffee beans charging operation more easy.

The motion of brushes around the perforated pan, of lamp cleaning brushes and of the brush working on the plate 12 for the collection and disposal of trash and hulls, are derived from the hollow shaft 23, to which the brush supporting arms are connected through suitable bushes, as i. e. the bush 24 of brush 13, and the bush 25 of coffee beans stirring brush, which will be described in detail hereinafter.

A rod 27, connected to a further bush 26 fitted on said shaft, carries a brush of highly resilient material, designed to rub against the upper portions of lamps 9, in order to remove therefrom the trash and hulls which are continuously falling down from the perforated plate 3. A brush of the kind could be conveniently made with fiberglass—a material showing superior wearing and incombustible properties.

A second shaft 22, fitted inside of first hollow shaft 23—to which only a rotary motion is imparted—comes forth therefrom and is provided with a head 28, that engages with the cover 2 as well as with the corresponding electrical contacts.

A reciprocating vertical motion can be manually or automatically imparted to said shaft 23, whereby the cover can be quickly lifted and again closed, thus allowing a visual check of roasting operation, in addition to all other checking devices provided thereto.

The cover can be opened automatically—as explained in detail hereinafter—or by hand, and in this latter case suitable counterweights could be provided to make the operation more easy.

The fan 20 is driven by a motor 29. If required, the fan-motor unit could be fitted outside of machine, and in such a latter case recourse must be made to a longer and suitably connected vacuum duct.

The shafts 22 and 23 are driven by a motor 30 of suitable output. The power is transmitted from a pulley 31, keyed on the shaft thereof, to pulley 32 through a belt 33. Said pulley 32 is keyed on the shaft of a worm 34 (see Fig. 2) that engages with the worm wheel 35 keyed on the hollow shaft 23, whereby this latter is conveniently driven. The reciprocating motion is imparted to shaft 22 by means of a worm wheel 36 engaged with a worm wheel 37. A threading 38, cut on an inside surface of said wheel 37, allows same worm wheel to be engaged with a corresponding threading cut on shaft 22. The worm wheel 36 can be thrown manually into engagement with the worm wheel 37. Fig. 3, which is a section along line A—A of Fig. 2, shows clearly how said wormwheel is engaged and disengaged.

Referring now to Fig. 3, the worm wheel 34 is keyed on a shaft 40 by which a continuous rotary motion is imparted thereto.

The pulley 32 (see Fig. 1) is fitted on same shaft 40, and can be moved thereon, from the one to another of three subsequent positions as defined by the slots 42, by means of handwheel 41. Said pulley is then kept on any one of said positions by a stop ball 43 which is caused to snap into the corresponding slot by the pressure spring 44. In the position of said shaft 40 as shown in the figure, a gear 45 keyed thereon, engages with the mating gear 46 keyed on the shaft 47 of worm wheel 36 by which a reciprocating motion is imparted to shaft 22. By indexing the pulley to the right by a slot on the shaft 40, the jaws 48 of a coupling that rotates together with the wheel 45, engages with the slots 48' of the mating coupling secured to bush 49 whereon the wheel 34 is keyed; thus a rotary motion is imparted to shaft 23. In such a position, the gear 45 is still in mesh with the gear 46, whereby a rotary motion is imparted at the same time to worm wheel 34 and worm wheel 36.

By indexing the pulley 32 by a further slot to the right on the shaft 40, the jaws 48 and 49' will be completely engaged, while the gears 45 and 46 are thrown out of engagement, whereby the rotary motion is transmitted only to shaft 34 (and thus only to shaft 23). The aforedescribed gears and wormwheels are fitted within an oiltight box 50 and work in oil bath. The wormwheel 37 that meshes with the worm 36, is laid on two thrust bearings, thus minimizing the friction, while the shafts 40 and 47 are laid on ball bearings, as shown by Fig. 3. A preferred embodiment form of brushes for the stirring of coffee beans on the perforated pan is shown on Fig. 4.

Such brushes consist, in principle, of a bar, having a plain surface 51 which rests, while the device is in operation, on said perforated pan, and an upper semi-cylindrical surface, over which the coffee beans flow while the brush is in operation.

The arms 52 by which said brushes are driven, are articulated to driving bush 25. The shape of same brushes must be such as to ensure a thorough stirring during the roasting and cooling steps, a levelling of coffee beans bed, and a subsequent discharge of the whole quantity of roasted coffee.

Obviously, any number of such brushes can be fitted, according to the thickness of the coffee bean bed to be stirred, and to the diameter of the pan; moreover their length can be nearly equal to the radius of the pan, or to a fraction thereof, and in such a latter case recourse could be made to a staggered arrangement of brushes.

As already stated, the brushes are connected to the driving bush 25 by means of the articulated arms 52 and, due to their weight, the last sections of the corresponding arms are forced against the pan.

Referring now to Fig. 5, that shows the wiring diagram of the machine electrical equipment, a main switch 53 serves to switch-in and out both circuits of the lamps and of the motor. A remote controlled reversing switch 57 suitably inserted in the circuit 54 of the motor, derived beyond the aforestated main switch, serves to control the reciprocating motion of shaft 22 through the limit switches 55 and 56 by which at the pre-established time, the motor is switched out, and the switches 58 and 59 are respectively switched-in for the forward and reverse motion.

The lamp circuit is fed at the required voltage by means of a transformer 60 through a suitable change-over switch, acting as a starting point of conductors to different lamp units 62.

An automatic time switch 63, provided with an adjustable pre-warning signal, is inserted at this point. Such a switch is extremely useful when the roasting operation is set at a previously known cycle time, since it obviates the necessity to exert a continuous and accurate check on roasting operation, thus positively excluding any danger of charring.

What is claimed is:

1. In a roasting oven, in combination, a supporting means; a receiving means supported by said supporting means, said receiving means being adapted to receive a substance to be roasted, said receiving means also having a bottom portion and an open top portion, at least said bottom portion being made of a material through which infra-red rays may pass and through which waste material may drop; infra-red ray emitting means mounted on said supporting means for directing infra-red rays toward a substance received by said receiving means, said infra-red ray emitting means including at least one upper infra-red lamp arranged above said receiving means and adapted to direct infra-red rays through said open top portion of said receiving means and at least one lower infra-red lamp arranged below said receiving means and adapted to direct infra-red rays through said bottom portion of said receiving means; agitating means arranged at least partially within said receiving means for agitating the substance received by said receiving means; and waste material removal means arranged below said receiving means for removing waste material issuing through said bottom portion of said receiving means.

2. In a roasting oven, in combination, a supporting means; a receiving means supported by said supporting means, said receiving means being adapted to receive a substance to be roasted, said receiving means also having a bottom portion and an open top portion, at least said bottom portion being made of a material through which infra-red rays may pass and through which waste material may drop; infra-red ray emitting means mounted on said supporting means for directing infra-red rays toward a substance received by said receiving means, said infra-red ray emitting means including at least one upper infra-red lamp arranged above said receiving means and adapted to direct infra-red rays through said open top portion of said receiving means and at least one lower infra-red lamp arranged below said receiving means and adapted to direct infra-red rays through said bottom portion of said receiving means; agitating means arranged at least partially within said receiving means for agitating the substance received by said receiving means; waste material removal means arranged below said receiving means and said lower infra-red lamp for removing waste material issuing through said bottom portion of said receiving means; and cleaning means arranged above said lower infra-red lamp for removing waste material issued through said bottom portion of said receiving means and retained on said lower infra-red lamp.

References Cited in the file of this patent

UNITED STATES PATENTS

| | | |
|---|---|---|
| 90,386 | Persing | May 25, 1869 |
| 1,063,188 | Simone | June 3, 1913 |
| 1,911,763 | Maede | May 30, 1933 |
| 2,172,603 | Adams et al. | Sept. 12, 1939 |
| 2,295,920 | Vermillion | Sept. 15, 1942 |
| 2,327,282 | McComb | Aug. 17, 1943 |
| 2,340,345 | Richeson | Feb. 1, 1944 |
| 2,464,421 | Torres | Mar. 15, 1949 |
| 2,581,148 | Scull et al. | Jan. 1, 1952 |

FOREIGN PATENTS

| | | |
|---|---|---|
| 146,186 | Australia | Apr. 24, 1952 |
| 468,457 | Italy | Jan. 22, 1952 |